US009215125B2

(12) United States Patent
Basso et al.

(10) Patent No.: US 9,215,125 B2
(45) Date of Patent: Dec. 15, 2015

(54) TECHNIQUES FOR CONNECTING AN EXTERNAL NETWORK COPROCESSOR TO A NETWORK PROCESSOR PACKET PARSER

(75) Inventors: Claude Basso, Raleigh, NC (US); Jean L. Calvignac, Raleigh, NC (US); Chih-Jen Chang, Research Triangle Park, NC (US); Damon Philippe, Research Triangle Park, NC (US); Natarajan Vaidhyanathan, Research Triangle Park, NC (US); Colin B. Verrilli, Research Triangle Park, NC (US); Fabrice Jean Verplanken, LaGuade (FR)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 13/884,664

(22) PCT Filed: Dec. 19, 2011

(86) PCT No.: PCT/EP2011/073254
§ 371 (c)(1),
(2), (4) Date: Aug. 5, 2013

(87) PCT Pub. No.: WO2012/084834
PCT Pub. Date: Jun. 28, 2012

(65) Prior Publication Data
US 2013/0308653 A1      Nov. 21, 2013

(30) Foreign Application Priority Data
Dec. 20, 2010   (EP) ..................................... 10306455

(51) Int. Cl.
*H04L 29/06*       (2006.01)
*G06F 9/38*        (2006.01)
*G06F 15/163*      (2006.01)
*G06F 9/54*        (2006.01)

(52) U.S. Cl.
CPC .......... *H04L 29/0653* (2013.01); *G06F 9/3877* (2013.01); *G06F 15/163* (2013.01); *H04L 69/22* (2013.01); *G06F 9/544* (2013.01)

(58) Field of Classification Search
None
See application file for complete search history.

(56) References Cited

U.S. PATENT DOCUMENTS 7,305,047 B1 *  12/2007  Turner ......................... 375/316
7,428,618 B2    9/2008   Najam et al.
(Continued)

FOREIGN PATENT DOCUMENTS

TW            200644523 A      12/2006

OTHER PUBLICATIONS

International Application No. PCT/EP2011/073254, International Search Report, May 4, 2012.

*Primary Examiner* — Edan Orgad
*Assistant Examiner* — Saumit Shah
(74) *Attorney, Agent, or Firm* — Russell Ng PLLC; Matthew Baca (57) ABSTRACT

A network processor includes first communication protocol ports that each support 'M' minimum size packet data path traffic on 'N' lanes at 'S' Gigabits per second (Gbps) and traffic with different communication protocol units on 'n' additional lanes at 's' Gbps. The first communication protocol ports support access to an external coprocessor using parsing logic located in each of the first communication protocol ports. The parsing logic, during a parsing period, is configured to send a request to the external coprocessor at reception of a 'M' size packet and to receive a response from the external coprocessor. The parsing logic sends a request maximum 'm' size byte word to the external coprocessor on one of the additional lanes and receives a response maximum 'm' size byte word from the external coprocessor on the one of the additional lanes while complying with the equation N×S/M=<n×s/m.

18 Claims, 5 Drawing Sheets

(56) References Cited

U.S. PATENT DOCUMENTS

| | | |
|---|---|---|
| 2003/0041172 A1 | 2/2003 | Calvignac |
| 2005/0010925 A1* | 1/2005 | Khawand et al. ............. 719/310 |
| 2007/0127486 A1* | 6/2007 | Choi et al. .................... 370/392 |
| 2008/0049660 A1* | 2/2008 | Kwan et al. ................... 370/318 |
| 2008/0278508 A1* | 11/2008 | Anderson et al. ............. 345/519 |
| 2009/0080428 A1* | 3/2009 | Witkowski et al. ........... 370/392 |
| 2009/0240850 A1 | 9/2009 | Li et al. |
| 2010/0189168 A1* | 7/2010 | Booth et al. .................. 375/219 |

* cited by examiner

TECHNIQUES FOR CONNECTING AN EXTERNAL NETWORK COPROCESSOR TO A NETWORK PROCESSOR PACKET PARSER

This application is a National Stage of International Application No. PCT/EP2011/073254 (which has a priority date of Dec. 20, 2010), entitled "CONNECTING AN EXTERNAL NETWORK COPROCESSOR TO A NETWORK PROCESSOR PACKET PARSER," filed Dec. 19, 2011, the disclosure of which is hereby incorporated herein by reference in its entirety for all purposes.

BACKGROUND

The disclosure generally relates to an external network coprocessor and, more specifically, to techniques for connecting an external network coprocessor to a network processor packet parser.

High-performance network processors on a single chip may have to handle sophisticated network functions. For example, a packet parser in an Ethernet adapter may have to support high-level packet classification and packet filtering functions that cannot all be all handled on a network processor chip. In this case, a parser typically hands off some packet processing functions to an external coprocessor, which provides results that are used by the parser. In general, functions that are handed off from a parser may require different processing architectures and performance that a network processor chip is not able to include due to area limitation, as certain network functions may require logic and arrays that are relatively large.

A typical network processing function that may be externalized from a packet parser to a coprocessor is packet classification, which may include a lookup in a ternary content-addressable memory (TCAM) or a hash-based lookup for which different search algorithms are employed (e.g., a Patricia tree, a Cuckoo algorithm, etc.). Another function that can be externalized is packet filtering functions that are based on recognition of patterns extracted from a packet. In general, a packet parser connection to an external coprocessor should be flexible enough to adapt to various bandwidth requirements and to support external processor programmable technologies, e.g., field-programmable gate array (FPGA) technology, to facilitate various different final network processor system designs.

U.S. Pat. No. 7,428,618 (hereinafter "the '618 patent") discloses a network node structure that is architected around two net processors (i.e., one net processor for each packet stream direction) that communicate via a shared memory (see, for example, FIG. 2). The structure includes a set of coprocessors located on a daughter card. The coprocessors are interconnected via hardware control logic that also provides an interface to one of the two net processors, via a dedicated memory. In the '618 patent, communication between coprocessors is facilitated by a dedicated interface for exchanging requests and responses between the coprocessors and the net processor via a dedicated memory.

U.S. Patent Application Publication No. 2003/0041172 (hereinafter "the '172 publication") discloses a network node structure that allegedly improves performance, as compared to an existing network processor. According to the '172 publication, an external coprocessor is added to an existing network processor infrastructure. In general, the external coprocessor is not capable of running in a correlated way with the network processor, due to requirements for large buffers and complex state retrieval algorithms. Per the '172 publication, specific tasks are not executed in parallel with main packet handling by a network processor. In general, a physical interface to the coprocessor cannot be adjusted to various networking system requirements.

SUMMARY

A network processor includes first communication protocol ports that each support 'M' minimum size packet data path traffic on 'N' lanes at 'S' Gigabits per second (Gbps) and traffic with different communication protocol units on 'n' additional lanes at 's' Gbps. The first communication protocol ports support access to an external coprocessor using parsing logic located in each of the first communication protocol ports. The parsing logic, during a parsing period, is configured to send a request to the external coprocessor at reception of a 'M' size packet and to receive a response from the external coprocessor. The parsing logic sends a request maximum 'm' size byte word to the external coprocessor on one of the additional lanes at 's' Gbps and receives a response maximum 'm' size byte word from the external coprocessor on the one of the additional lanes at 's' Gbps while complying with the equation $N \times S/M = < n \times s/m$.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

As will be appreciated by one of ordinary skill in the art, the present invention may be embodied as a method, system, device, or computer program product. Accordingly, the present invention may take the form of an embodiment including hardware, an embodiment including software (including firmware, resident software, microcode, etc.), or an embodiment combining software and hardware aspects that may all generally be referred to herein as a circuit, module, or system. The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein, the term "coupled" includes a direct electrical connection between elements or blocks and an indirect electrical connection between elements or blocks achieved using one or more intervening elements or blocks.

Various embodiments of the present disclosure provide techniques for connecting a packet parser in a network processor chip to an external coprocessor. The techniques facilitate sending a workload (from the network processor chip to the external coprocessor) and receiving results (from the external processor at the network processor chip) in a flexible way that facilitates reuse of existing control/management bidirectional serial lanes and supports many types of traffic and bandwidth on the serial lanes. In one embodiment, a network processor includes first communication protocol ports that each support 'M' minimum sized packet data path traffic on 'N' lanes at 'S' Gigabits per second (Gbps), while supporting traffic with different communication protocol units in the network processor on 'n' additional lanes at 's' Gbps.

The first communication protocol ports support access to an external coprocessor using a parser (parsing logic) located in each of the first communication protocol ports. During a parsing period, the ports send a request to the external coprocessor at reception of a 'M' minimum sized packet and receive a response from the external coprocessor. According to one or more embodiments, a parser sends a request of a maximum 'm' byte word to a coprocessor on 'n' additional 's' Gbps lanes and receives a response of a maximum 'm' byte word from the external coprocessor on the same additional 's' Gbps lanes such that an equation (e.g., N×S/M=<n×s/m) is verified.

For example, a network processor may include Ethernet ports that each support 64-byte minimum sized Ethernet packet data path traffic on four lanes at 3.125 Gbps and support traffic with different communication protocol units in the network processor on one additional lane at 3.125 Gbps to support access to an external coprocessor by parsing logic located in each of the ports. In one or more embodiments, the ports, during a parsing period, send a request to the external coprocessor at reception of a 64-byte minimum sized packet and receive a response from the external coprocessor. For example, the parser may send a request with a maximum of 16-byte word to the coprocessor on the additional 3.125 Gbps lane and receive a response of a maximum 16-byte word from the external coprocessor on the same additional 3.125 Gbps lane.

Minimum 'M' byte size word traffic may be multiplexed in a statically configurable two-input multiplexer of a first communication protocol port with traffic from a communication protocol unit in a network processor. In this case, the two-input multiplexer is configurable to select between one of two traffic forms. For example, a coprocessor access maximum 'm' byte word traffic may be first multiplexed in a two-input dynamic multiplexer with one coprocessor access maximum 'm' byte word traffic from one other first communication protocol port before being multiplexed in the statically configurable two-input multiplexer. In this case, the dynamic multiplexer facilitates selecting between the multiplexed traffic under the control of a traffic arbitration algorithm.

In one or more embodiments, the traffic of the additional lane is serialized for transmission and deserialized following reception in a high-speed serializer/deserializer (SerDes) of 's' Gbps. As another example, the traffic of the additional bidirectional lane may be serialized in transmission and deserialized in reception in a high-speed SerDes of 2×'s' Gbps. For example, traffic may be supported by different communication protocol units that provide 2.5 Gbps PCIe x1 traffic. The traffic supported by different communication protocol units may include 1.25 Gbps Serial Gigabit Media Independent Interface (SGMII) traffic. An implemented traffic arbitration algorithm may be, for example, a 'work conserving' round-robin algorithm. The maximum size 'm' byte request words and the maximum size 'm' byte response words for external coprocessor access may include one identifier of the first communication protocol port to support the corresponding coprocessor access maximum size 'm' byte word traffic.

In at least one embodiment, the network processor further includes Ethernet ports that each support 64-byte minimum size data path traffic on four lanes at 3.125 Gbps and support on one additional 3.125 Gbps speed lane traffic with different communication protocol units in the network processor. In various embodiments, the network processor supports access to one external coprocessor by parsing network logic located in each of the Ethernet protocol ports. The parsing logic is configured to, during a parsing period, send a request to the external coprocessor at reception of a minimum size 'M' byte packet and receive a response from the external coprocessor. The network processor includes the parser configured to send a request maximum 16-byte word to the coprocessor on the one additional lane and to receive a response maximum 16-byte size word from the external coprocessor on the same 3.125 speed additional lane, so that the N×S/M=<n×s/m equation is verified (i.e., complied with).

In one or more embodiments, the network processor includes a two-input multiplexer that multiplexes the coprocessor access maximum size 'm' byte word traffic in the first communication protocol port with traffic associated with one network protocol unit in the network processor. The two-input multiplexer may be statically configurable to one of the two multiplexed traffic lanes. The network processor may further include a two-input dynamic multiplexer that multiplexes one coprocessor access maximum size 'm' byte word traffic from one first communication protocol port and one coprocessor access maximum size 'm' byte word traffic from one other first communication protocol port before the multiplexed traffic is multiplexed in the statically configurable two-input multiplexer. The dynamic multiplexer is configured to select between the two multiplexed traffic under the control of a traffic arbitration algorithm. An Ethernet physical interface of the network processor may support Ethernet data traffic and different communication protocol units (for control and data) traffic on additional lanes. Parser command flow with the external coprocessor may also be supported on the additional lanes to minimize the number of serial lanes on the network processor (which facilitates optimizing package size and cost and minimizing silicon area consumed by large high-speed SerDes cores).

Figure 1:
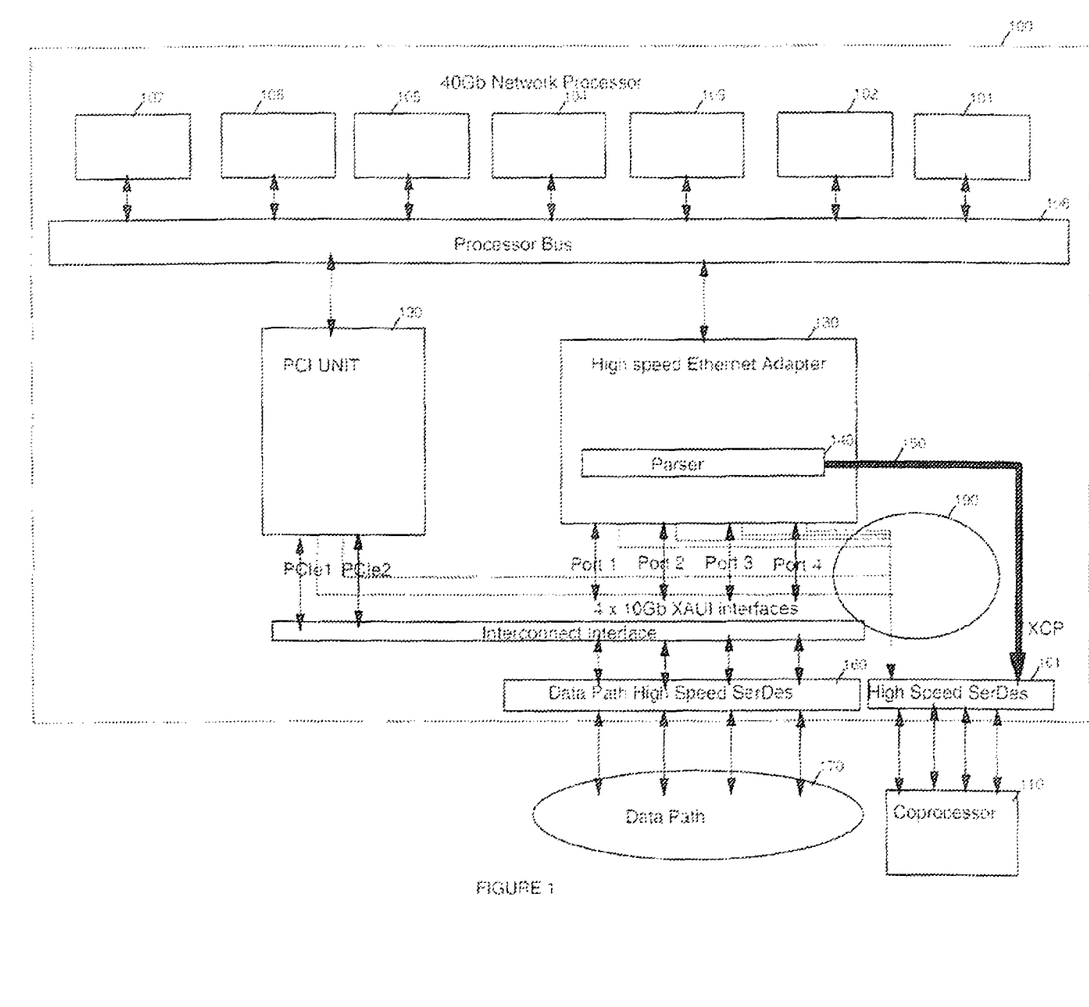
FIG. 1 is a view of a network processor with its main functions, output lanes, and connection to an external coprocessor configured according to an embodiment of the disclosure.

FIG. 1 is a global view of a network processor with its main functions, output lanes, and connection to an external coprocessor in which one embodiment of the disclosure may be implemented. Network processor 100 of FIG. 1 may be a 40 Gb network processor that exchanges data with a computer (not shown) and that implements processing functions with specialized processors (101-107) connected to an internal processor bus 108. In various embodiments, network processor 100 supports protocols employed by a peripheral component interconnect (PCI) unit 120 (that is connected to bus 108 and supports outside connections to, for example, a universal serial bus (USB) port) and by an Ethernet adapter 130 that supports 4×10 Gbps IEEE standardized XAUI interfaces (i.e., port 1, port 2, port 3, and port 4), which represent Ethernet packet data paths. PCI and Ethernet data traffic are merged through an interconnect interface to the four Ethernet ports.

The PCI and Ethernet data traffic is then serialized (top-down traffic) in a high-speed SerDes 160. A bidirectional high-speed data path 170 includes four output serialized lanes of 4×10b×2 for transmit and receive. An additional path 190, which originates from PCI unit 120 and Ethernet adapter 130, has a lower speed than the data path and may include, for example, four output paths providing a 2×1 Gbps Ethernet data path and two 2.5 Gbps PCI Express data paths. Additional path 190 is serialized through a second high-speed SerDes 161. In network processor 100, parser logic 140 (included in Ethernet adapter 130) performs Ethernet packet classification and offloads some functions to external coprocessor 110.

Coprocessor 110 is 'external' to network processor 100, which is implemented in a single chip. While four inputs are represented on coprocessor 110, it should be appreciated that the number of inputs on an external coprocessor configured according to the present disclosure may be more or less that four. In the top-down parser path, parser 140 assembles request messages in its input registers. Assembly of a request messages is complete when parser 140 fills a 'command byte' (which is described with reference to FIG. 5) of the message. Parser 140 triggers 'request' message encoding, serializing, and transmission to coprocessor 110 with the command byte, whose bidirectional message flow 150 is represented by the arrow in the drawing. In its bottom-up path, parser 140 deserializes and decodes a 'response message', received from coprocessor 110, and merges the result with a result of its own packet process. It should be appreciated that the bidirectional XCP parser-coprocessor interface is not a standard interface.

Figure 2:
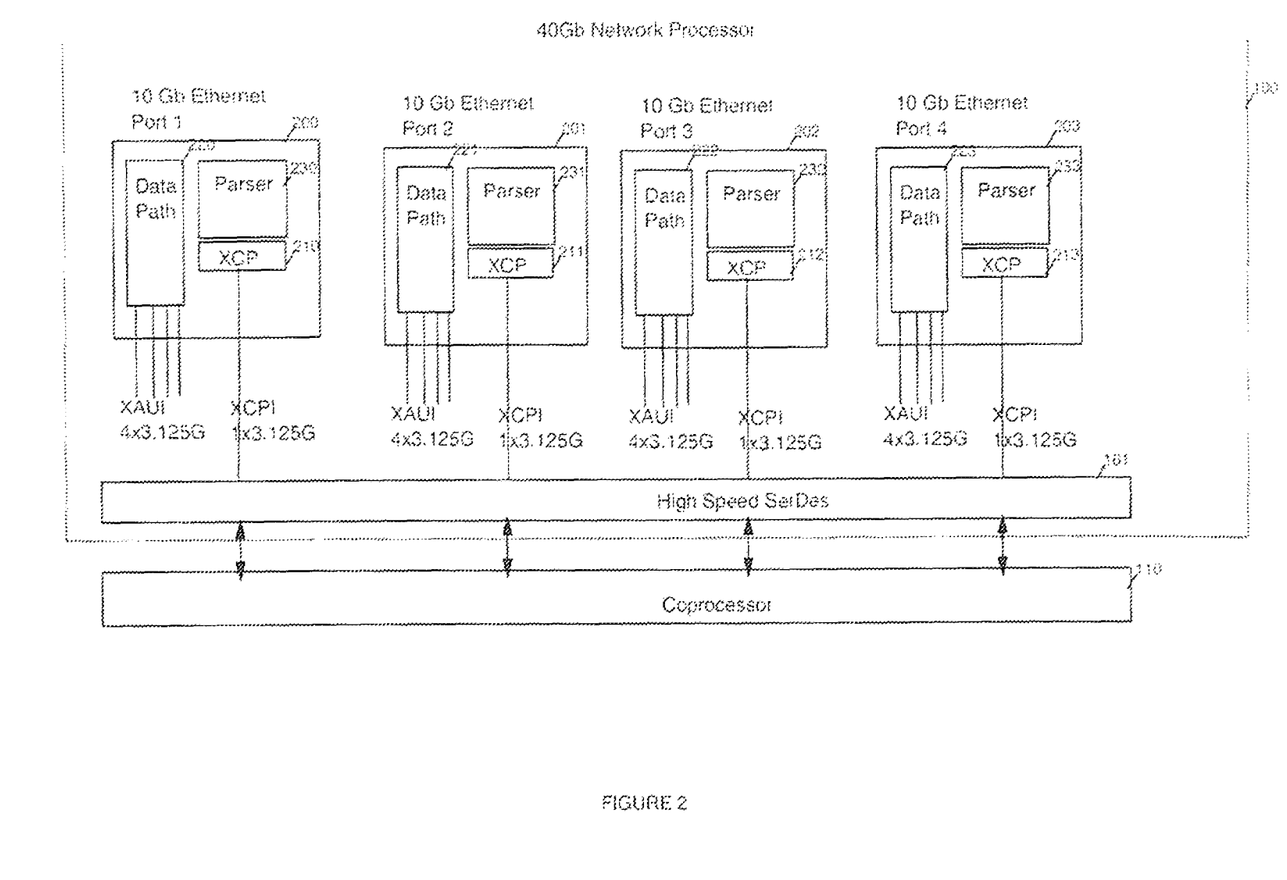
FIG. 2 illustrates an implementation of a connection of a network processor parser to an external coprocessor according to one embodiment.

FIG. 2 illustrates an exemplary connection of a network processor parser to an external coprocessor. As used herein, the term 'ports' is interchangeable with 'logic units'. As is illustrated in FIG. 2, network processor 100 has four Ethernet ports 200-203 at 10 Gbps that each provide a bidirectional XAUI interface that provide four lanes at 3.125 Gbps in the transmit and receive direction. The XAUI interface supports data paths 220-223, which support Ethernet packet traffic. The data traffic is serialized in high-speed SerDes 160 (see FIG. 1). Received packets are parsed (e.g., using a finite state machine (FSM) based picoprocessor) by parsers 230-233 and external coprocessor 110. That is, packet parsing requires additional processing to be done by external coprocessor 110 with a request for the additional processing being sent and a response being received through XCP interfaces 210-213.

Parsers 230-233 are configured to build XCP requests at any time during a packet parsing window and send the XCP request using one 3.125 Gbps serial lane for each Ethernet port 200-203. Assuming typical XCP requests of a maximum of 16 bytes long, which is ¼ of the minimal Ethernet packet size (64B), are sent on four lanes of the XAUI interface at 3.125 Gbps, one additional 3.125 Gbps lane for XCP interfaces 210-213 is adequate. Serialization/deserialization is performed in a high-speed SerDes 161 before reaching coprocessor 110. In various embodiments, each XCP interface is shared with Ethernet data traffic on the 10 Gbps Ethernet ports of network processor 100.

It should be appreciated that the techniques disclosed herein may be employed with Fibre Channel or other communication protocol ports for which a number of serial lanes require optimization. Assuming a communication protocol port provides 'N' serial lanes at 'S' Gbps to support a flow of packets having a minimum size of 'M' bytes and 'n' additional serial lanes of speed 's' supporting request/response words of a maximum of 'm' bytes, the general equation N×S/M=<n×s/m should be verified. In general, the variable defined must match with the following same 'p' and 'P' packet periodicities (p=P). On the XAUI lanes P=(M×10)/(N×S). On the 'n' additional lanes p=(m×10)/n×s, where 'P' and 'p' are expressed in nanoseconds, 'M' and 'N' in bytes, 10 is for the number of bits, 'N' and 'n' are numbers of lanes and 'S' and 's' are in Gbps.

Figure 3:
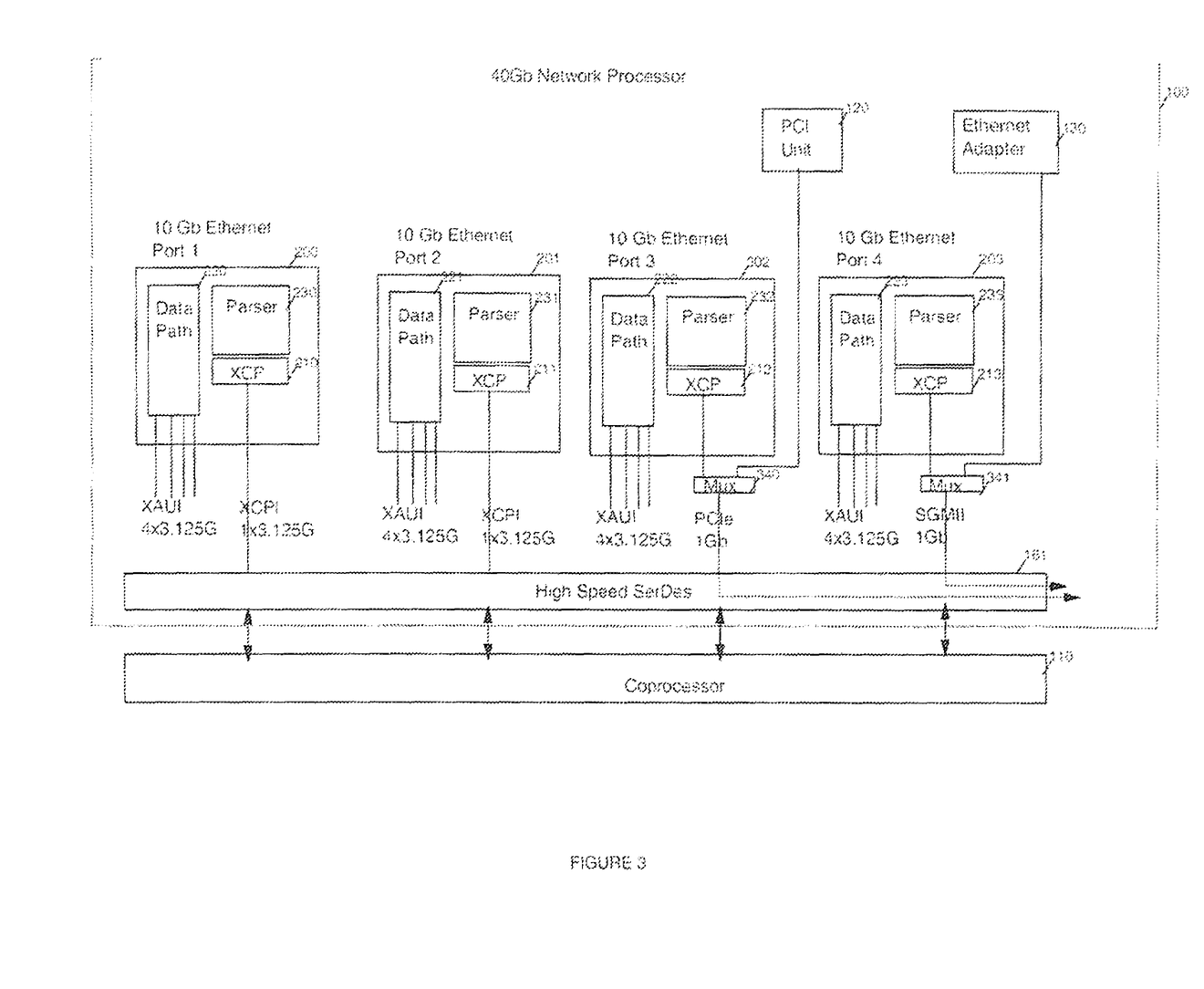
FIG. 3 illustrates a first optimization of a network processor parser connection to an external coprocessor according to one embodiment.

FIG. 3 illustrates a first optimization of a network processor parser connection to an external coprocessor. A typical 40 Gb network processor implements four XAUI interfaces and a few extra serial lanes for control and management purposes, e.g., two 1.25 Gbps (standardized) SGMII Ethernet lanes for network management and two 2.5 Gbps PCIe x1 lanes for peripheral control (traffic towards, for example, a computer USB port). As it is more desirable to minimize the number of serial lanes on a network processor, first lane sharing is implemented. Each of the four control/management lanes can be independently configured for SGMII from Ethernet adapter 130, PCIex1 from PCI unit 120, or for external coprocessor interface. In the case where one additional lane is configured as an XCP external coprocessor interface, the additional lane allows the parser associated with one of the four 10G ports to extend its functionality by requesting additional processing by external coprocessor 110.

According to one embodiment, lane sharing is implemented using static multiplexers 340 and 341 illustrated in FIG. 3 with XCP traffic shared on Port 3 and Port 4. Static multiplexer 340 shares a lane between XCP 212 and PCIe x1 traffic (from PCI unit 120) and static multiplexer 341 shares another lane between XCP 213 and SGMII traffic (from Ethernet adapter 130) for network management. Multiplexer 341 provides either parser traffic or Ethernet control traffic according to its configuration. Multiplexers 340 and 341 may be configured at system initialization of network processor 100 for a desired input traffic. In FIG. 3, port 1 and port 2 XCP lanes are dedicated to parser traffic and port 3 and port 4 can be configured to support XCP traffic or PCI and Ethernet traffic, respectively. For brevity only two control lanes are represented. In practice, two 1.25 Gbps SGMII Ethernet lanes (for network management) and two 2.5 Gbps PCIex1 lanes (for peripheral control) may be supported, as each Ethernet port may be multiplexed.

Figure 4:
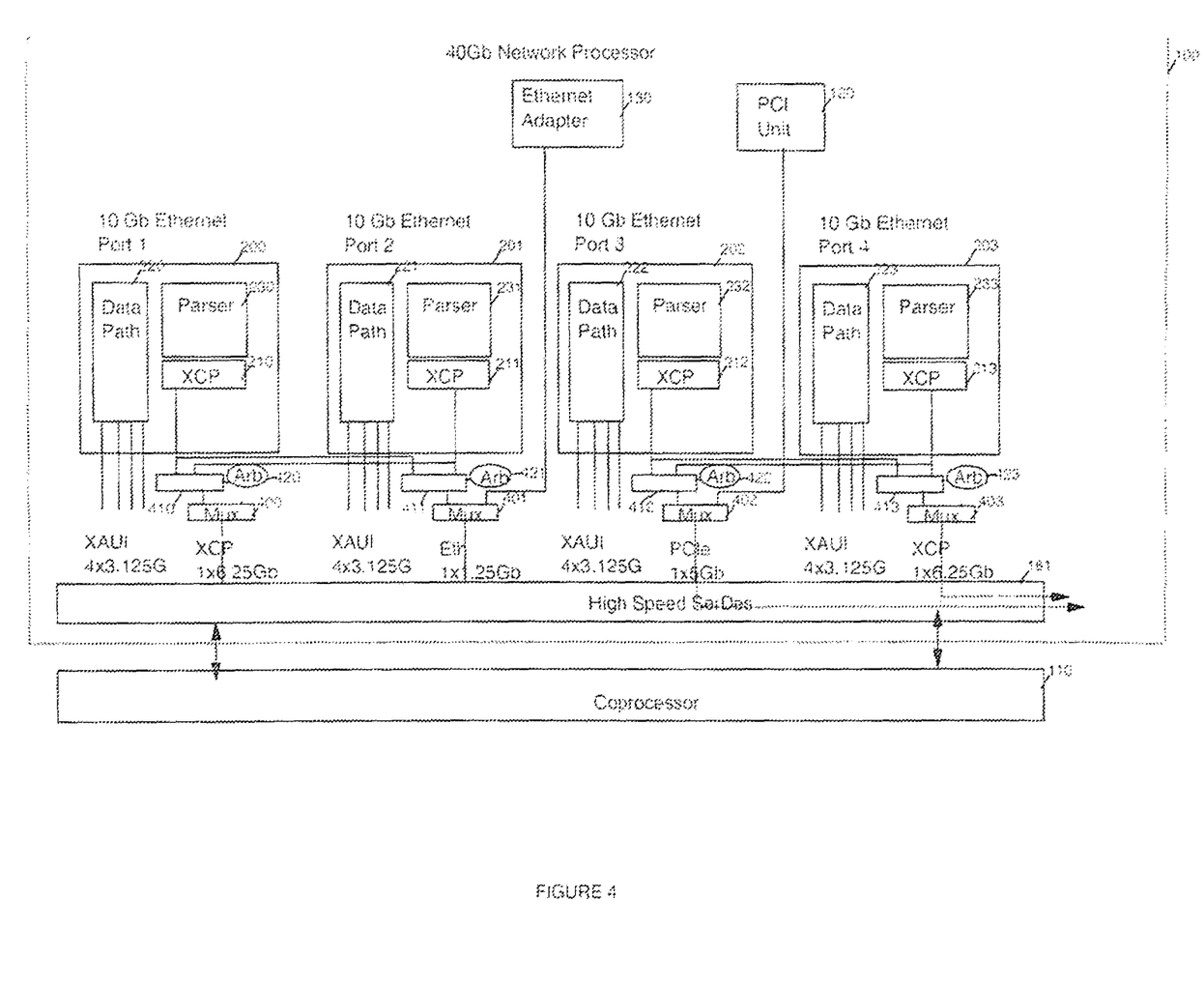
FIG. 4 illustrates a second optimization of a network processor parser connection to an external coprocessor according another embodiment.

FIG. 4 illustrates a second optimization of a network processor parser connection to an external coprocessor, where control/management lane sharing between external coprocessor 110 and PCI and/or Ethernet traffic configures each control/management lane for external coprocessor access with two parsers, as contrasted with one parser. Static multiplexers 400-403 are associated with each Ethernet port such that each control/management lane can be configured for parser traffic or PCI/Ethernet traffic. For brevity, connections with PCI units and Ethernet adapters are represented only on port 2 and port 3. It should be appreciated that similar connections may exist on port 1 and port 4. In the embodiment of FIG. 4, multiplexers 410-413 are added at each Ethernet port to multiplex traffic from two parsers on each lane.

When static multiplexers 400-403 are configured for allowing only external coprocessor access (XCP interface), multiplexers 400-403 receive external coprocessor access traffic from parsers for two connected ports. For example, multiplexer 410 and 411 are configured to select coprocessor access traffic from parser 231 or parser 230. In various embodiments, multiplexers 410-413 are dynamically configured. That is, multiplexers 410-413 are not configured at system initialization of network processor 100 but can be dynamically configured to accept both types of traffic when network processor 100 is active. In one or more embodiments, traffic is managed in dynamic multiplexers 400-403 with arbiters 420-423, which may, for example, implement a 'work conserving' round robin algorithm.

As is known, a 'work conserving' arbiter algorithm may allow alternate traffic. In the event that one of static multiplexers 400-403 is configured to only accept PCI or Ethernet traffic, coprocessor access of parsers of two ports connected to a same dynamic multiplexer 410-413 may be used for supporting the traffic of coprocessor access from two Ethernet port parsers. This allows preservation of two additional lanes for their original function (PCIex1, SGMII Ethernet) while still providing external coprocessor access to four parsers of four Ethernet 10G ports. In general, the solution is flexible enough to allow many possible configurations. If a network processor provides eight Ethernet port logics, four inputs of a coprocessor can be used by a parser interface with the coprocessor. In one or more embodiments, multiplexing of two parser coprocessor access traffic operates on requests (e.g., maximum 16-byte XCP words sent by a parser to a coprocessor) and responses (e.g., maximum 16-byte XCP words received by the parser from the coprocessor). In various embodiments, requests from two parsers are arbitrated in a round-robin fashion and responses identify a port to which receiving additional lane traffic should be sent.

Figure 5:
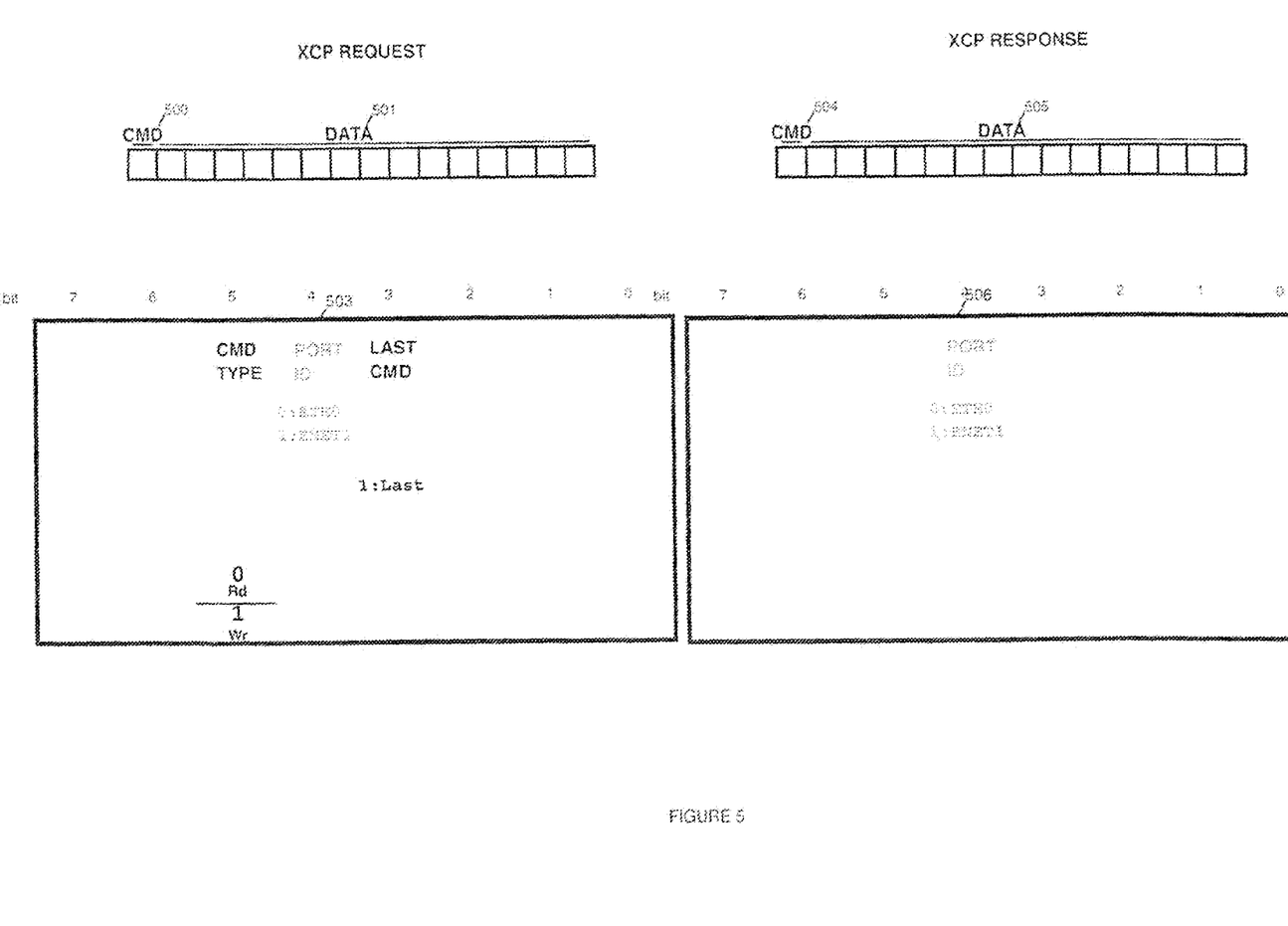
FIG. 5 illustrates an XCP request and response format exchanged between a network processor parser and an external coprocessor according to one embodiment of the present disclosure.

FIG. 5 illustrates an exemplary XCP request and response format exchanged between a network processor parser and an external coprocessor according to an embodiment of the present disclosure. In FIG. 5, a request and response variable sized 16-byte maximum format of the XCP interface, used by the parser to communicate with the external coprocessor, is illustrated. The request format comprises a first command byte 500 with the last fifteen bytes being used for data 501. Command byte 500 may include, for example, a command type bit, bit 5, which may be '0' for a read command and '1' for a write command and a 'last command' bit (bit 3) that indicates to a coprocessor if the command is the last command or if the coprocessor needs to wait for a next command. A PortID bit 503 (e.g., at bit 4 of the command byte of the request) defines an origin of the command, as command traffic may be multiplexed. The same bit 4 is used with the same PortID bit value 506 in command byte 504 of the 16-byte format response of the coprocessor with the remaining fifteen bytes 505 being used for data. The PortID bit specifies one of two possible values, which is sufficient to designate one of two multiplexed parser traffic ports, to facilitate steering of a response to a correct parser.

It is noted that the output of the control/management lane on which the Ethernet port is configured with the static multiplexer as supporting the coprocessor access traffic, when two coprocessor access traffic connections are dynamically multiplexed on the same lane the total traffic rate is of 2×3.125 Gbps=6.25 Gbps. In this case a high-speed SerDes 161 of 6.25 Gbps known in the art can be used and is adequate. When the dynamic multiplexing of the preferred embodiment is not used, the coprocessor access traffic on one Ethernet port is 3.125 Gbps and this is the maximum rate to enter into the high-speed SerDes 161 as the Ethernet control/management traffic rate is 1.25 Gbps and the PCIe x1 traffic which is 2.5 Gbps also crosses the high-speed SerDes 161. For this reason a lower performance high-speed SerDes (3.125 Gbps) can be used. The flexibility of the external coprocessor interface is also achieved with multiple speed choices on the serial lanes, so that slower speeds can be used when cost optimized implementations of external coprocessors do not use high-speed serial links (e.g. some low-end FPGA families). Higher speeds can be used when using the lane multiplexing schemes. It is noted that the embodiments as described above can apply to any type of external coprocessor, such as a processor, an ASIC or a FPGA coprocessor.

Accordingly, techniques for connecting an external network coprocessor to a network processor packet parser have been disclosed herein that advantageously facilitate adjusting a physical interface to a coprocessor to meet various networking system requirements.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method in a network processor that includes first communication protocol ports that each support 'M' minimum size packet data path traffic on 'N' lanes at 'S' Gigabits per second (Gbps) and that support traffic with different communication protocol units in the network processor on 'n' additional lanes at 's' Gbps for using the first communication protocol ports to support access to an external coprocessor by parsing logic located in each of the first communication protocol ports which, during a parsing period, sends a request to the external coprocessor at reception of a 'M' size packet and receives a response from the external coprocessor, the method comprising:

sending, by the parsing logic, a request for a maximum 'm' size byte word to the external coprocessor on one of the additional lanes at 's' Gbps;

receiving a response having a maximum 'm' size byte word from the external coprocessor on the one of the additional lanes at 's' Gbps while complying with the equation N×S/M=<n×s/m; and before sending traffic on the 'n' additional lanes at 's' Gbps, multiplexing, using a two-input multiplexer, the external coprocessor access minimum 'M' byte size word traffic from one of the first communication protocol ports and traffic from one of the communication protocol units, wherein the two-input multiplexer is statically configurable.

2. The method of claim 1, wherein the first communication protocol ports are Ethernet ports that each support 64-byte minimum size Ethernet packet data path traffic on four lanes at 3.125 Gbps and support traffic with the different communication protocol units on one of the additional lanes at 3.125 Gbps for using the Ethernet ports to support access to the external coprocessor by the parsing logic located in each of the first communication protocol ports which, during a parsing period, send a request to the external coprocessor at reception of a 64-byte minimum size packet and receive a response from the external coprocessor, the method further comprising:

sending, by the parsing logic, a request for a maximum 16-byte word to the external coprocessor on a first one of the additional lanes; and receiving a response having a maximum 16-byte word from the external coprocessor on the first one of the additional lanes.

3. The method of claim 1, wherein the statically multiplexed coprocessor access maximum 'm' byte word traffic, before being multiplexed in the statically configurable two-input multiplexer, is first multiplexed in a two-input dynamic multiplexer with one coprocessor access maximum 'm' byte word traffic from a different one of the first communication protocol ports, the dynamic multiplexer selecting the two multiplexed traffic under the control of a traffic arbitration algorithm.

4. The method of claim 3, wherein the traffic arbitration algorithm is a 'work conserving' round-robin algorithm.

5. The method of claim 1, wherein the traffic of the additional lanes is serialized in transmission and deserialized in reception in a serializer/deserializer of 's' Gbps.

6. The method of claim 1, wherein the traffic of the additional lanes is serialized in transmission and deserialized in reception in a serializer/deserializer of 2×'s' Gbps.

7. The method of claim 1, wherein the traffic supported by the different communication protocol units includes 2.5 Gbps peripheral component interconnect express (PCIe) x1 traffic.

8. The method of claim 1, wherein the traffic supported by the different communication protocol units includes 1.25 Gbps serial gigabit media independent interface (SGMII) traffic.

9. The method of claim 1, wherein the request for a maximum 'm' size byte word and the response having a maximum 'm' size byte word for external coprocessor access include an identifier of one of the first communication protocol ports supporting corresponding coprocessor access maximum 'm' byte word traffic.

10. A network processor, comprising:

communication protocol units; and first communication protocol ports that include parsing logic, wherein the first communication protocol ports each support 'M' minimum size packet data path traffic on 'N' lanes at 'S' Gigabits per second (Gbps) and support traffic with one or more of the communication protocol units on 'n' additional lanes at 's' Gbps to support access to an external coprocessor by the parsing logic located in each of the first communication protocol ports, and wherein the parsing logic, during a parsing period, sends a request for a maximum 'm' size byte word to the external coprocessor on one of the additional lanes at 's' Gbps at reception of a 'M' size packet and receives a response having a maximum 'm' size byte word from the external coprocessor on the one of the additional lanes at 's' Gbps while complying with the equation N×S/M=<n×s/m; and a two-input multiplexer that, before sending traffic on the 'n' additional lanes at 's' Gbps, multiplexes the external coprocessor access minimum 'M' byte size word traffic from one of the first communication protocol ports and traffic from one of the communication protocol units, wherein the two-input multiplexer that is statically configurable.

11. The network processor of claim 10, wherein the first communication protocol ports are Ethernet ports that each support 64-byte minimum size Ethernet packet data path traffic on four lanes at 3.125 Gbps and support traffic with the different communication protocol units on one of the additional lanes at 3.125 Gbps, and wherein the parsing logic sends a request for a maximum 16-byte word to the external coprocessor on a first one of the additional lanes at reception of a 64-byte minimum size packet and receives a response having a maximum 16-byte word from the external coprocessor on the first one of the additional lanes.

12. The network processor of claim 10, further comprising:

a two-input dynamic multiplexer selecting between coprocessor access maximum 'm' byte word traffic from different ones of the first communication protocol ports under the control of a traffic arbitration algorithm, wherein the statically multiplexed coprocessor access maximum 'm' byte word traffic, before being multiplexed in the statically configurable two-input multiplexer, is first multiplexed in the two-input dynamic multiplexer.

13. The network processor of claim 10, wherein the traffic of the additional lanes is serialized in transmission and deserialized in reception in a serializer/deserializer of 's' Gbps.

14. The network processor of claim 10, wherein the traffic of the additional lanes is serialized in transmission and deserialized in reception in a serializer/deserializer of 2×'s' Gbps.

15. The network processor of claim 10, wherein the traffic supported by the different communication protocol units includes 2.5 Gbps peripheral component interconnect express (PCIe) x1 traffic.

16. The network processor of claim 10, wherein the traffic supported by the different communication protocol units includes 1.25 Gbps serial gigabit media independent interface (SGMII) traffic.

17. The network processor of claim 10, wherein the request for a maximum 'm' size byte word and the response having a maximum 'm' size byte word for external coprocessor access include an identifier of one of the first communication protocol ports supporting a corresponding coprocessor access maximum 'm' byte word traffic.

18. A method in a network processor that includes first communication protocol ports that each support 'M' minimum size packet data path traffic on 'N' lanes at 'S' Gigabits per second (Gbps) and that support traffic with different communication protocol units in the network processor on 'n' additional lanes at 's' Gbps for using the first communication protocol ports to support access to an external coprocessor by parsing logic located in each of the first communication protocol ports, the method comprising:

during a parsing period, sending, by the parsing logic, a request for a maximum 'm' size byte word to the external coprocessor on one of the additional lanes at 's' Gbps in response to reception of a 'M' size packet;

receiving a response having a maximum 'm' size byte word from the external coprocessor on the one of the additional lanes at 's' Gbps while complying with the equation $N \times S/M =< n \times s/m$; and before sending traffic on the 'n' additional lanes at 's' Gbps, multiplexing, using a two-input multiplexer, the external coprocessor access minimum 'M' byte size word traffic from one of the first communication protocol ports and traffic from one of the communication protocol units, wherein the two-input multiplexer is statically configurable.

* * * * *